Aug. 5, 1930.  R. GARBS  1,772,439
BRACKET FOR TROUBLE LAMPS
Filed May 7, 1929
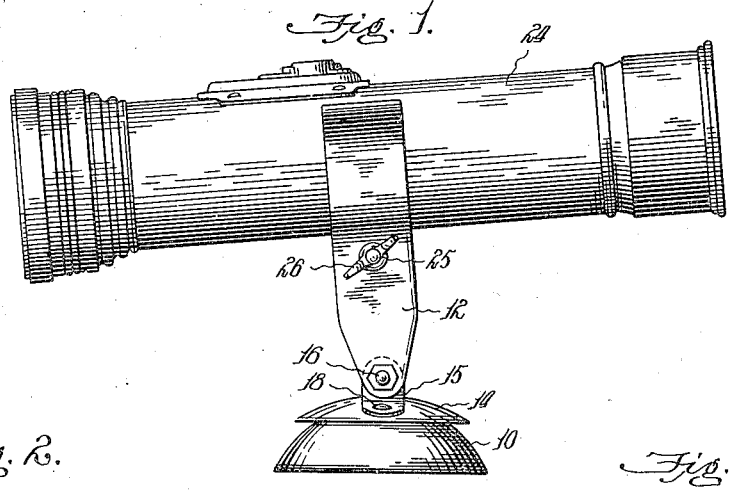
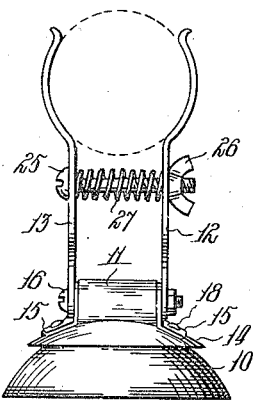
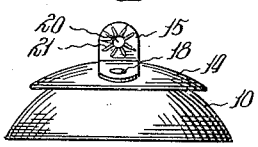
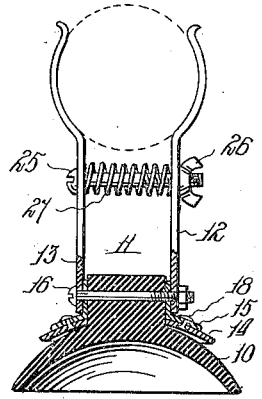
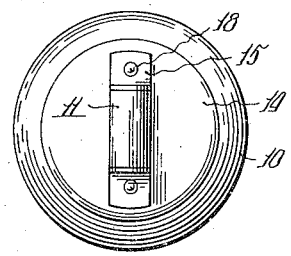
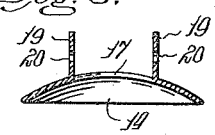
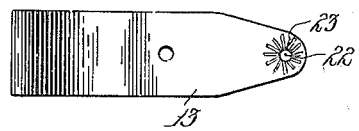
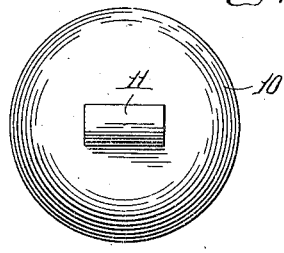
Inventor:
Raymond Garbs.
By—
Attorney.

Patented Aug. 5, 1930

1,772,439

UNITED STATES PATENT OFFICE

RAYMOND GARBS, OF KANKAKEE, ILLINOIS

BRACKET FOR TROUBLE LAMPS

Application filed May 7, 1929. Serial No. 361,166.

My invention is an improvement in supporting brackets for portable lamps, and relates to that special type in which the bracket carrying the lamp is provided with means, as a suction cup, for securing it in place temporarily.

The primary object of my invention is to provide a supporting bracket of this general character of particular utility in supporting a trouble lamp in working on an automobile, in the present instance contemplating an adjustment of the lamp by means of the bracket so that the rays of light can be directed to different parts of the automobile as desired, the suction cup providing the means for readily attaching and detaching the device to any flat surface.

A further object of my invention is to provide a lamp supporting bracket in which the clamping members for attaching the lamp to the bracket are pivotally connected to the suction cup for swinging adjustment thereon, the particular construction of the suction cup and pivotal connection of the clamping members thereto serving to firmly hold the lamp in any of its adjusted positions.

A still further object of my invention is to provide a lamp supporting bracket of this type in which the suction cup is reinforced by a backing plate to limit the distention of said cup and protect the same whereby its life and utility are materially increased.

With these principal objects in view my invention consists of a portable lamp bracket comprising a rubber suction cup having a backing plate with upstanding ears to which the clamping members are pivoted, the rubber suction cup having an upward extension fitting between the pivot-ears to provide a yielding connection between said ears and the clamping members for holding the adjustment of the bracket and lamp, and the clamping members secured to the lamp by a bolt with a spring interposed between said clamping members for separating them when the nut on the bolt is loosened, all as hereinafter fully described and more specifically set forth in the appended claims.

In the drawings:—

Figure 1 is an elevation of my improved portable lamp supporting bracket showing its application to an ordinary flash light.

Fig. 2 is a side view of the supporting bracket.

Fig. 3 is a similar view partly in section.

Figs. 4 and 5 are detail views of the suction cup in side elevation and plan respectively.

Fig. 6 is a detail view of one of the clamping members of the bracket looking at the inner side thereof.

Fig. 7 is a plan view of the rubber suction cup, the backing plate being removed, and Fig. 8 is a sectional view illustrating a modification of the backing plate used in connection with the suction cup.

Like numerals of reference indicate like parts in all the views of the drawings.

In carrying out my invention I provide a rubber suction cup 10 having an upward extension 11 at the center thereof which provides for connecting the clamping members 12 and 13 to said cup, said extension being rounded in cross section and having squared ends to cooperate with a backing plate 14 having upstanding ears 15 15 between which the extension of the suction cup fits and to which ears the aforesaid clamping members of the bracket are pivoted by a bolt 16 passing through the clamping members 12—13, ears 15 15, and upward extension 11 of the suction cup as shown in Fig. 3 of the drawings. The backing plate 14 is provided with an opening 17 (Fig. 8) between the ears through which the extension on the suction cup projects, and as shown in Figs. 1 to 5 inclusive the ears 15 15 are in the form of metal angle pieces secured to the backing plate by rivets 18, while in the modification shown in Fig. 8 the ears 19 19 are stamped from the backing plate, in each instance the ears being pierced by holes 20 to receive the aforementioned bolt 16 and the outer faces of said ears provided with depressions or serrations 21 cooperating with serrations 22 at the inner side of the clamping members 12 and 13 around the bolt holes 23 therein, (see Fig. 6). By having the rubber suction cup extended upward between the attaching ears on the backing plate and providing the meeting faces of said attaching ears and clamping members with serrations the nut on the bolt 16 can be tightened sufficient to firmly secure the clamping members to the suction cup and the extension of the latter being resilient will permit the ears 15 15 to yield in the swinging adjustment of the clamping plates for the escapement of the meeting faces 21 and 22 one over the other, thus forming a slightly yielding pivotal connection which will permit quick adjustment and firmly hold the lamp in whatever position it is adjusted.

For the purpose of attaching a lamp, such as flash light 24, to the clamping members the free ends of the latter are curved outwardly to receive the flash light casing between them, and in order to clamp said members to said casing a bolt 25 is employed which extends transversely through the clamping members below the outwardly curved upper ends thereof, a winged nut 26 being used in connection with the bolt, and for convenience in separating the jaws to receive the lamp a helical spring 27 is mounted on the bolt between the clamping members for separating the latter when the winged nut is unscrewed. It will be understood of course that the outer ends of the clamping members may be of any shape desired for the attachment of the portable supporting bracket to any other form of lamp or any other article it is desired to support in a temporary location through the medium of the suction cup, and instead of a portable lamp in the form of a flash light as shown in the drawings an ordinary electric lamp at the end of a cord may be used. Furthermore, it will be understood that the particular form of portable supporting device herein shown and described may be employed in various connections where an adjustable supporting bracket is desired.

The supporting bracket carrying the lamp is adapted to be attached to any flat surface irrespective of the position of the same by pressing the suction cup against the supporting surface and in the present instance the lamp may be adjusted by swinging the clamping members on their pivotal connection to the suction cup or base, the suction cup providing a quick and convenient means for attaching and detaching the bracket. In using the bracket with a trouble lamp as an automobile accessory the device can be applied to any flat surface vertically disposed or otherwise which is of sufficient area to receive the suction cup.

I claim:

1. A portable lamp supporting bracket comprising a rubber suction cup having a resilient pintle ear formed integrally therewith, resilient metal ears on the cup at opposite sides of said pintle ear, a pair of clamping members having the upper ends thereof flared outwardly to receive the lamp between them, and a pintle passing through the lower ends of the clamping members and aforesaid ears to connect the parts together, the yielding pivotal connection between the clamping members and resilient ears on the suction cup providing for adjustment of the clamping members with respect to the suction cup.

2. A portable lamp supporting bracket comprising a rubber suction cup, an upwardly projecting ear formed integrally therewith and having a pintle opening, yielding apertured metal ears attached to the cup at opposite sides of the ear thereon with serrations around the apertures, a pair of clamping members between the upper ends of which the lamp is secured, and a pintle passing through the ears and lower ends of the clamping members, the clamping members having serrations cooperating with the serrations on the metal ears for holding the adjustment of the clamping members with respect to the suction cup.

3. A portable lamp supporting bracket comprising a suction cup, a backing plate secured thereto and overlying the body portion thereof to limit expansion of the cup, ears with pintle openings projecting upwardly from said backing plate, and a pair of clamping members pivoted to the ears for swinging engagement therewith and having outwardly flared upper ends between which the lamp is detachably secured.

4. A portable lamp supporting bracket comprising a rubber suction cup having an integral extension forming a resilient pintle ear, a dished backing plate through which said pintle ear passes overlying the body portion of the suction cup and spaced slightly therefrom, ears projecting upwardly from the backing plate at opposite ends of the extension or resilient pintle ear on the suction cup, a pair of clamping members, and a pintle passing through the inner ends of said clamping members and through the ears of the backing plate and resilient ear on the suction cup for pivotally and adjustably connecting the clamping members to said suction cup, the lamp being clamped between the upper ends of said members.

5. A portable lamp supporting bracket comprising a rubber suction cup having an integral extension forming a resilient pintle ear, a backing plate overlying the body portion of the suction cup and having a central opening through which said pintle ear passes, ears projecting upwardly from the backing plate at opposite ends of the extension on the suction cup, a pair of clamping members having outwardly flared upper ends between which the lamp is clamped, a pintle passing through the inner ends of said clamping members and the ears on the backing plate and suction cup for adjustably connecting said clamping members to said suction cup;

together with a bolt connecting the clamping members for securing the lamp between the flared upper ends thereof.

6. A portable lamp supporting bracket comprising a rubber suction cup having an integral extension forming a resilient pintle ear, a backing plate overlying the body portion of the cup and having a central opening through which said pintle ear passes, ears projecting upwardly from the backing plate at opposite ends of the extension or ear on the suction cup, a pair of clamping members having outwardly flared upper ends between which the lamp is received, and a pintle passing through the inner ends of the clamping members, ears on the backing plate, and extension of the suction cup for adjustably connecting said clamping members to said suction cup; together with a bolt connecting the clamping members for securing the lamp between the flared upper ends thereof, and a spring on the bolt interposed between said clamping members for normally separating same.

RAYMOND GARBS.